March 7, 1939.  S. L. TOLMAN  2,149,751
METHOD AND APPARATUS FOR CLEANING SEWAGE
Filed April 2, 1936
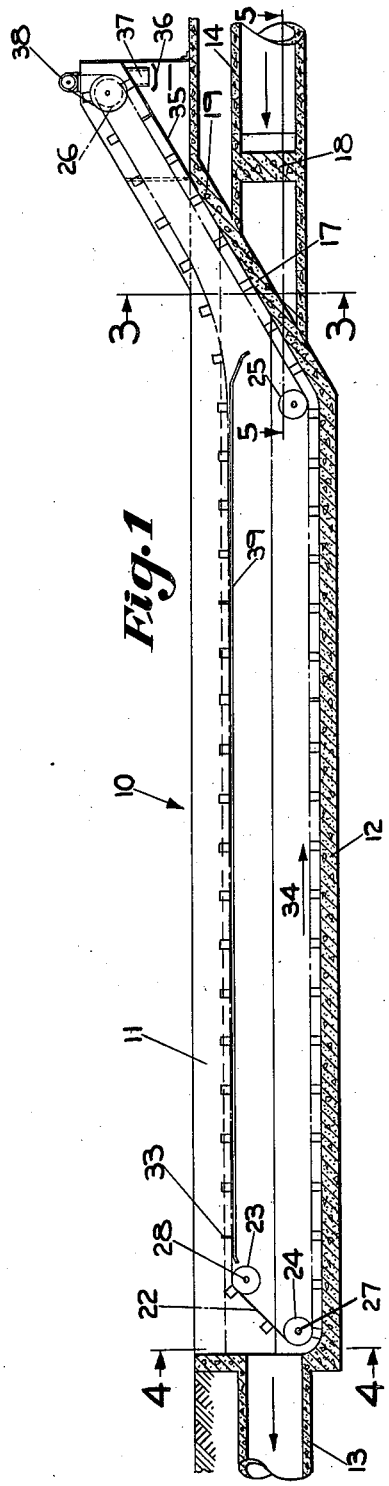
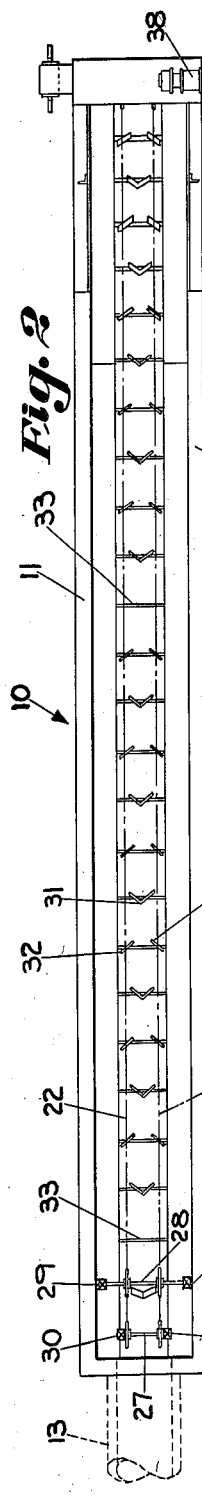
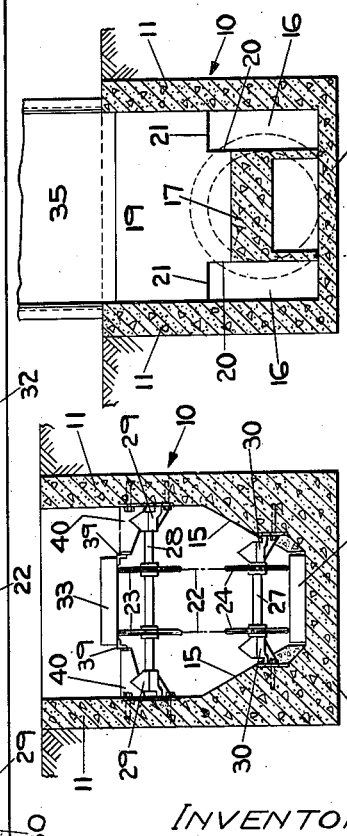
INVENTOR:
SAMUEL L. TOLMAN,
BY
Chas. M. Nissen,
ATTY.

Patented Mar. 7, 1939

2,149,751

UNITED STATES PATENT OFFICE 2,149,751

METHOD AND APPARATUS FOR CLEANING SEWAGE

Samuel L. Tolman, Columbus, Ohio, assignor to The Jeffrey Manufacturing Company, a corporation of Ohio Application April 2, 1936, Serial No. 72,358

14 Claims. (Cl. 210—3)

This invention relates to an improved method and apparatus for cleaning sewage and more particularly to a method and apparatus for removing grit from sewage.

An object of the invention is to provide an improved method and apparatus for removing grit from sewage whereby there will be no formation of stagnant areas in the grit settling tank, thus avoiding accumulation of putrescible organic matter.

Another object of the invention is to provide a method and apparatus for cleaning and removing grit from sewage whereby liquid can flow over an inclined surface adjacent the point of grit removal, and flow directly into the stream of influent sewage.

Other objects of the invention will appear hereinafter, the novel features and combinations being set forth in the appended claims.

In the accompanying drawing,

Fig. 1 is a sectional elevational view of an apparatus comprising my invention;

Fig. 2 is a plan view of the device of Fig. 1;

Fig. 3 is a sectional view taken on the line 3—3 of Fig. 1 looking in the direction of the arrows;

Fig. 4 is a sectional view taken on the line 4—4 of Fig. 1 looking in the direction of the arrows; and Fig. 5 is a sectional plan view taken on the line 5—5 of Fig. 1 looking in the direction of the arrows.

In the treatment of sewage, particularly where the putrescible organic matter is digested in a digester, it is necessary first to remove the inorganic grit from the sewage before it is fed to the digester. The method and apparatus herein disclosed relates to the removal of this grit from the sewage.

It has been found in practice that there is a tendency in most grit removers toward the formation of quiescent or stagnant areas with a consequent accumulation of putrescible organic matter. This, of course, is very objectionable because all organic matter should flow from the grit chamber to subsequent apparatus such as the settling tanks and finally to the digester. The apparatus herein disclosed is particularly constructed to avoid the formation of the mentioned quiescent or stagnant areas, and thereby to insure against an accumulation of putrescible organic matter.

As seen in the drawing, the apparatus comprising my invention includes a grit settling tank or chamber 10 preferably formed of concrete and having side walls 11, 11 and a bottom 12. Adjacent one end is an effluent conduit 13 through which the effluent sewage will flow from the tank 10. Adjacent the other end is an influent conduit 14 adapted to direct the incoming sewage into said tank 10. As is clearly illustrated in the drawing, the tank 10 is preferably of an elongated construction and has a pair of bottom tapering side walls 15, 15 which form continuations of the side walls 11, 11 and lead to the bottom 12 of the tank 10 which is of reduced width.

As best seen in Figs. 1, 3 and 5 of the drawing the influent conduit 14 is divided into two parallel branches 16, 16 by a centrally disposed column 17 which has a pointed deflecting portion 18 adapted to guide the influent from the conduit 14 into the branches 16. The column 17 has a flat upper surface which is inclined both to the horizontal and to the vertical, which surface extends entirely between the side walls 11 of the tank 10 adjacent the top portion of said tank, as best illustrated at 19 in Fig. 3. The central portion of the column 17, of course, does not extend completely between the side walls 11 because it is terminated by the influent branches 16, 16. As a consequence, the column 17 has side edges 20, 20 which define extremities of the branches 16, 16, and the extended portion 19 of said column has bottom edges 21, 21 which likewise define extremities of the influent branches 16, 16.

Associated with the tank 10 is a conveyor which may be generally of the type disclosed and claimed in the application of R. E. Briggs for Material treating apparatus, Serial No. 701,550, filed December 8, 1933. Briefly described said apparatus comprises a conveyor formed of a pair of continuous chains 22, 22 adapted to ride over sprockets 23, 24, 25 and 26. Said sprockets 23, 24 and 25 are mounted upon suitable shafts within the tank 10, the shafts for sprockets 23 and 24 being seen at 27 and 28 respectively in Fig. 4. Said shafts are, of course, mounted on appropriate brackets seen at 29 and 30, which brackets are rigidly supported by the walls of the tank 10.

Mounted upon the continuous chains 22, 22 is a plurality of flights, as best seen in Fig. 2 of the drawing, said chains carrying a pair of flights 31 formed in the shape of a plow which, when moving along the bottom 12 of the tank 10, would tend to move the settled grit outwardly. This pair of flights 31 will be followed by a pair of flights 32 which are disposed to move the material inwardly along the bottom wall of the tank 10. A number of such pairs of flights 31 and 32 will be provided to cause a to and fro movement of the grit on the bottom 12 of tank 10, thereby to wash it and remove therefrom any putrescible organic matter which tends to adhere thereto. This washing action will be effective throughout substantially the entire length of the tank 10, and will free the inorganic grit of adhering organic matter.

The chains 22, 22 also carry flat transversely extending flights 33, which will scrape the grit along the bottom of the tank 10 in the direction of the arrow 34, or from the effluent end to the influent end of such tank 10. The chains 22 travel outside of the tank 10 under the influence of sprockets 26 and thus the flights travel along the inclined surface forming the top of the column 17, as directed by sprockets 25 and 26. As a consequence, in the operation of the conveyor, the washed grit will be conveyed up the inclined surface forming the top of column 17 and will be conveyed to a trough 35 from which it will be directed to a transversely extending belt conveyor 36 by a chute 37. An electric motor 38 will be provided for operating the conveyor including the chains 22, 22. It may also be noted that the upper run of the chains 22, 22 is supported through the flights 33 resting on longitudinally extending angle members 39, 39 supported from the side walls 11, 11 by brackets 40, 40.

In the operation of the device comprising my invention, the sewage will be introduced into the tank 10 from the influent conduit 14 by way of the influent branches 16, 16. Said sewage will then flow through the tank 10 at a rate which will favor settling of the grit, but will not favor settling of the organic material. As a consequence, the grit will settle on the bottom 12 being directed thereto by the inclined side walls 15. The effluent sewage thus freed of grit will flow from the tank 10 by way of the effluent conduit 13. The conveying mechanism through the operation of the flights 31 and 32 will scrape the settled grit to and fro on the bottom 12 to free it of adhering organic material. The flights 33 will move the grit longitudinally of the tank 10 along the bottom 12 and up the inclined surface forming the top of the column 17. As the grit moves up said inclined surface any water which is moved therealong by the flights 33 will flow laterally of said surface and over the edges 20 into the path of the incoming sewage. Such fluid as flows laterally of the flights 33, when any of said flights is riding on the extended portion 19 of said inclined surface will flow laterally of said flights and down said inclined surface over the edges 21, 21 into the branches 16, 16. It will thus be noted that there is no place within the tank 10 in which quiescent or stagnant areas can be found which would encourage an accumulation of putrescible organic matter. This insures the prompt removal of organic matter from the tank 10, and results in a directing of the fluid which flows from the inclined surface on top of column 17 directly into the path of the incoming influent which is fed to tank 10 through branches 16, 16.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. The method of cleaning sewage grit comprising introducing grit containing sewage into a chamber favoring settling of the grit, conveying the settled grit up an inclined surface and out of said chamber at the end of said chamber where the sewage is introduced, and permitting the liquid to separate from the grit and flow laterally on said inclined surface and directly from said surface into the path of the influent sewage, while removing the effluent from said chamber at a remote point from said inclined surface.

2. The method of cleaning sewage grit comprising introducing grit containing sewage into a chamber favoring settling of the grit, washing the grit on the chamber bottom to free it of organic matter, conveying the freed grit up an inclined surface and out of said chamber, and permitting the liquid to separate from the grit and flow laterally on said inclined surface and directly into raw sewage flowing into said chamber, while removing the effluent from said chamber at a remote point from said inclined surface.

3. The method of cleaning sewage grit comprising introducing grit containing sewage into a chamber favoring settling of grit by directing the influent into a pair of parallel paths of entrance into the chamber, conveying the settled grit up an inclined surface between said parallel paths while permitting a flow of fluid laterally on said inclined surface and directly into both paths of the influent while the grit is removed from said chamber.

4. In apparatus for removing grit from sewage, the combination with an elongated settling tank, a sewage influent conduit at one end and an effluent conduit at the other end, continuous scraper conveyor means in said tank for removing settled grit and conveying it out of said tank adjacent said influent conduit, said tank being constructed and arranged to direct the influent into said tank along two separated parallel paths between which said conveyor removes the grit.

5. In apparatus for cleaning and separating grit from sewage, the combination with a settling tank, of an influent conduit, an effluent conduit, a continuous flat inclined surface adjacent said influent conduit extending from below the liquid level of said tank to a position above said liquid level and having an edge common with an edge of said influent conduit, and continuous conveyor means constructed and arranged to clean settled grit of attached organic material and convey said grit out of said tank up said inclined surface, while superelevated liquid flows from said grit back into the liquid in said tank.

6. In apparatus for separating grit from sewage, the combination with a settling tank, of an influent conduit, an effluent conduit, a continuous flat inclined surface adjacent said influent conduit extending from below the liquid level of said tank to a position above said liquid level and having side and bottom edges common with a side and top edge, respectively, of said influent conduit, and conveyor means constructed and arranged to convey settled grit out of said tank up said inclined surface.

7. A settling tank for sewage comprising a tank, an influent conduit, an effluent conduit, and means providing an inclined flat surface adjacent and positioned laterally of said influent conduit providing a supporting surface for material to be removed and extending above the normal liquid level of said tank, said supporting surface having at least one edge exposed directly to said influent conduit whereby fluid may flow laterally along said supporting surface and into the influent stream of sewage.

8. A settling tank for sewage comprising a tank, an influent conduit, and means providing an inclined surface adjacent said influent conduit providing a supporting surface for the removal of settled material, the inclined surface presenting side and bottom edges adjacent said influent conduit whereby fluid may flow from said inclined surface directly into the path of the influent flowing into said tank through said influent conduit.

9. A grit settling tank for sewage comprising an elongated tank having a substantially horizontal bottom, an influent conduit, an effluent conduit, means adjacent said influent conduit dividing it into branches and providing a surface inclined to the horizontal between said branches and forming a continuation of said bottom.

10. A grit settling tank for sewage comprising an elongated tank, an influent conduit, and effluent conduit, and means dividing said influent conduit into two branches and providing a continuous inclined surface extending as a continuation of the tank bottom and extending to the top of said tank above the normal liquid level of said tank, said means being so constructed and arranged that said branches will lead to said tank with one branch on each side of the bottom portion of said inclined surface.

11. In apparatus for removing grit from sewage, the combination with an elongated tank, said tank having a flat bottom and diverging side walls, of an influent conduit at one end of said tank, means dividing said conduit into two paths and forming an inclined surface continuing from said bottom and upwardly beyond the normal liquid level of said tank, continuous conveying means in said tank constructed and arranged to convey settled material along said tank bottom and out of said tank by conveying it up said incline, and means for driving said conveying means.

12. A grit settling tank for sewage comprising an elongated tank having a flat horizontal bottom and upwardly extending side walls having inclined portions leading to said flat bottom, an influent conduit at one end of said tank and an effluent conduit at the other end, and means dividing said influent conduit into two branches each aligned with an inclined portion of opposite side walls and thus aligned at opposite sides of said flat bottom and providing a continuous inclined surface extending as a continuation of said tank bottom and extending above the normal liquid level of said tank, said means being so constructed and arranged that said branches will lead to said tank with one branch on each side of the bottom portion of the inclined surface.

13. In apparatus for removing grit from sewage, the combination with an elongated tank having a flat horizontal bottom and side walls which converge to said bottom, of an effluent conduit at one end of said tank and an influent conduit at the other end thereof, means forming an inclined surface which is an extension of said flat bottom and extends upwardly above the normal liquid level in said tank and divides said influent conduit into two branches one on each side of said inclined surface with each branch aligned with a converging portion of the opposed side walls and thus aligned at opposite sides of said flat bottom, and continuous scraper conveyor means for conveying material along said flat bottom and up said incline and out of said tank.

14. In apparatus for cleaning and separating grit from sewage, the combination with a grit settling tank having an upwardly extending wall adjacent one end and side walls having tapered portions leading to a bottom wall of reduced width, and having influent and effluent conduits providing for a flow of sewage into and out of said tank, of a conveyor having laterally extending flights adapted to scrape said bottom wall of reduced width and to convey settled grit therealong and out of said tank by conveying it along said upwardly extending wall, a pair of rails spaced apart a distance to carry the upper run of said conveyor by supporting the ends of said flights and positioned above said inclined portions of said side walls, means supporting said rails from said side walls, and means for driving said conveyor.

SAMUEL L. TOLMAN.